(12) United States Patent
Cross et al.

(10) Patent No.: US 12,242,997 B2
(45) Date of Patent: *Mar. 4, 2025

(54) SYSTEM AND A PROCESS FOR MONITORING AND VERIFYING BUNKER FUEL EXCHANGE BETWEEN MARINE VESSELS

(71) Applicants: ADP Clear Pte Ltd., Singapore (SG); ADP Clear Pte Ltd., Singapore (SG)

(72) Inventors: Alistair Cross, Hermance (CH); Tyler Baron, Bursins (CH)

(73) Assignee: ADP Clear Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,606

(22) Filed: Aug. 2, 2022

(65) Prior Publication Data

US 2023/0034271 A1 Feb. 2, 2023

(30) Foreign Application Priority Data

Aug. 2, 2021 (EP) ..................................... 21189240
Aug. 2, 2021 (SG) ........................... 10202108445U (51) Int. Cl.
*G01F 15/063* (2022.01)
*B63B 27/34* (2006.01)
*G01F 1/56* (2006.01)
*G01N 9/32* (2006.01)
*G06Q 10/083* (2023.01)
*G08C 17/02* (2006.01)
*H04W 84/12* (2009.01)

(52) U.S. Cl.
CPC ........... *G06Q 10/083* (2013.01); *G08C 17/02* (2013.01)

(58) Field of Classification Search
CPC .............................. G06Q 10/083; G08C 17/02

USPC .......................................................... 702/45
See application file for complete search history.

(56) References Cited

U.S. PATENT DOCUMENTS

2010/0217536 A1\* 8/2010 Casimiro ................ G01F 1/849
702/45
2012/0109543 A1 5/2012 Weinstein et al.

FOREIGN PATENT DOCUMENTS

CN 112132383 A 12/2020
WO 2015165468 A1 11/2015

OTHER PUBLICATIONS

"Hazardous consequence dynamic simulation of LNG spill on water for ship-to-ship bunkering" Published by Elsevier (Year: 2017).\*

\* cited by examiner

*Primary Examiner* — Zeina Elchanti
(74) *Attorney, Agent, or Firm* — Kilpatrick Townsend & Stockton LLP (57) ABSTRACT

A system for monitoring and verifying a delivery process during which a fluid is delivered, via a bunker line, from a supplying marine vessel to a receiving marine vessel is disclosed. A data capture device comprises a measurement apparatus configured to measure one or more parameters related to the delivery process, such as a mass flow rate of the fluid through the bunker line or a density or a temperature of the fluid. A measurement apparatus being configured to generate an electronic record that can be stored in a memory. The system further includes a private network to provide a point-to-point wireless link between the supplying marine vessel and the receiving marine vessel. The client device is configured to generate a dashboard configured to present the electronic record to the first and second users and to accept an electronic signature of each of the first and second users.

21 Claims, 4 Drawing Sheets

SYSTEM AND A PROCESS FOR MONITORING AND VERIFYING BUNKER FUEL EXCHANGE BETWEEN MARINE VESSELS

CROSS-REFERENCES TO RELATED APPLICATIONS

This application claims the benefit of priority of European Patent Application No. EP21189240.1 filed Aug. 2, 2021 and Singapore Patent Application No. 10202108445U, filed on Aug. 2, 2021, both entitled "A System and a Process for Monitoring and Verifying Bunker Fuel Exchange Between Marine Vessels," which is hereby incorporated by reference herein in its entirety and for all purposes.

FIELD OF THE INVENTION

The present disclosure relates generally to a system for measuring an amount of fuel delivered during a bunkering operation between a barge and a vessel. More specifically, the inventive concepts described herein aim to allow such measurements to be reported in real time during the bunkering process and to ensure the authenticity of the measurements being reported.

BACKGROUND OF THE INVENTION

Bunkering malpractice is a well-known phenomenon in the shipping industry. Unscrupulous parties stand to make substantial profits through misreporting on the quality and/or the quantity of fuel delivered from a bunker supply ship (barge) to a bunker receiving vessel during bunkering processes. Bunker fuel can mean any distillate or residual fuel intended for combustion purposes for propulsion or for the operation of systems on board a marine vessel. Bunker fuels may include distillate marine (DM) fuel oils, high Sulphur fuel oil (HSFO), residual marine fuel oils (RM), ultra-low Sulphur fuel oil (ULSFO), very-low Sulphur fuel oil (VLSFO), heavy fuel oil (HFO), low-Sulphur fuel oil (LSFO), marine diesel oil (MDO), marine gas oil (MGO), LNG fuel bunker, etc. The bunker fuel is pumped through a bunker line from the barge to the receiving vessel. Bunkering is a somewhat manually intensive process with many opportunities for malpractices to arise, where significant quantities of fuel can go missing or otherwise remain unreported, thus resulting in lost revenue. A lot of effort has gone into trying to minimize such loss.

Traditionally, manual vessel sounding or dipping techniques were used to determine the amount of bunker fuel in a vessel. These methods allow for the volume of fuel to be estimated. But bunker fuel is usually sold by weight. The weight per unit volume varies depending on the density of the fuel, which can in turn vary with temperature or with pressure for example. Traditional practices for estimating the amount of fuel delivered are therefore rather labor-intensive, requiring laboratory tests to determine density and relying heavily on the use of manual dips and look-up tables to convert from volume to weight and so on. For example, using its look-up tables and measuring the height difference between the level of fuel in the bunker barge before and after the fuel delivery, the Barge Master may calculate that a six-inch drop in fuel level for ship X at temperature T corresponds to a given amount of fuel. The Chief Engineer of the receiving vessel may make its own calculations. Both parties document their calculations, and they validate and certify each other's assertions regarding the delivery details. Errors can often occur, either inadvertently or maliciously, which can result in a protest being filed by either of the parties or even in full-blown legal disputes. All of these processes are paper-based and require physical documents to be exchanged between the Barge Master and the Chief Engineer to manually sign-off the paperwork.

More up-to-date measurement methods allow for the weight, or mass, of the bunker fuel being delivered, to be measured directly. Directly measuring the mass of fuel delivered reduces errors which may occur when measuring volume, due to variations in density and/or viscosity of the fuel during the delivery session or due to the presence of air bubbles in the fuel. Direct measurement of mass can be done using a mass flowmeter, otherwise known as an inertial flowmeter. A mass flowmeter is a device for measuring mass flow rate of a fluid travelling through a tube, i.e. the mass of the fluid which passes a given point per unit time. A Coriolis mass flowmeter, inserted in the bunker line, may be used to directly measure the mass of fuel transferred during a bunkering session. The mass flowmeters used for monitoring bunkering processes are usually certified by a port authority or a national weights and measures office or any other authority responsible for ensuring that the mass flowmeters comply with industry-accepted metrology requirements. Such mass flowmeters usually have a controller to provide the necessary electronic control signals to control the flowmeter's operation and to receive measurement signals from the flowmeter. They can be configured to measure mass flow, volume flow, density, and temperature, for example. The controller may also have a transmitter for sending the measurement data to be processed. The data may be processed by a dedicated flow computer. Provision may be made to print out a bunker transfer receipt including the time, date, and the total quantity of fuel transferred, for example. The transfer receipt may be used as a legal (Weights & Measures) document. Information from the transfer receipt may be used to fill out the Bunker Delivery Note (BDN), which is an official receipt which will be used as the basis for a commercial invoice. The BDN lists the quantity of fuel delivered, the Sulphur content in % m/m and a small number of other physical characteristics. A drip sample is also taken and stored for future analysis should a dispute arise. Other documents and/or certificates related to safety procedures are also filled out. All of these documents have to be passed back and forth between the barge and the vessel for signing/countersigning.

The prior art includes systems and methods for measuring the amount of fuel delivered in a bunkering operation. Such systems may use a vibrating meter, such as a Coriolis flowmeter. Such systems and methods have been used to solve problems related to false or erroneous measurements which were known to occur using any of the more traditional methods described above, thus providing reliable bunkering operations for large ocean-going vessels. The prior art also includes systems which use Coriolis mass flowmeters which have been adapted to solve a problem where entrained air or other gasses in the bunker line would otherwise cause the flowmeter to provide false readings.

A bunker fuel transfer system that includes a measurement system is known, wherein various sensors are used to measure certain parameters related to bunker fuel flowing through a bunker line, or flow tube, during a bunkering session. The sensors include motion sensors of a Coriolis mass flowmeter configured to measure a flow rate of the bunker fuel through the bunker line, temperature sensors and pressure sensors, and the system is configured to calculate the mass of the fuel transferred during the bunkering session.

The system is further configured to generate a bunker report on the receiving vessel, documenting the amount of fuel transferred. This physical bunker report may then be signed off by the Chief Engineer of the receiving vessel and handed to the Barge Master for countersigning, in the usual manner described above, along with all the other paperwork related to the bunkering session. This system is also configured to generate and to archive the bunker transfer reports in an electronic file format for auditing purposes. The system may also comprise a wireless router for uploading the electronic bunker transfer report to a client FTP site via cellular or broadband wireless connectivity means or to send bunker transfer reports to clients via email.

Vessel monitoring systems for monitoring characteristics of a vessel from a remote location are known. Such systems generally use a mass flowmeter for monitoring fuel consumption. The systems further include a satellite transceiver to transmit the monitored data to a base station receiver via a satellite. Other vehicle monitoring systems may comprise a plurality of sensors, including a mass flowmeter, and a telemetry unit to convert the measured parameters into a characteristic to be monitored, and a transceiver for sending telemetry signals to a remote site for processing. The transceivers used in such systems generally operate using satellite, GPRS or WiMAX communications means.

Mass flowmeters have therefore been widely used in the prior art in the context of bunkering. However, although their introduction might have provided for more rigorous for reporting based on accurate mass-based measurements, it cannot be said that they have entirely eliminated the problems related to false reporting. Indeed, mass flowmeters may still be manipulated, particularly out at sea or in any location where they are not mandated, for example by using recirculating lines, low flow rates, improper stoppages, improper drive gain levels, lack of correction for aeration, and so on. Furthermore, even with the use of mass flowmeters, in a marine environment where there is usually no access to terrestrial communications networks, there still remains the problem of having to sign, exchange and countersign paper documents by manually passing the physical documents back and forth between the barge and the vessel.

Bunkering operations usually take place at sea, where connectivity to broadband wireless or satellite communications services may be limited or even non-existent. As such, it is not always possible for electronic bunker transfer reports to be sent to clients via wireless communications means. Furthermore, communications via satellites, even when a reliable connection may be sustained for long enough, do not provide a low enough latency for real-time monitoring of bunker delivery characteristics to be performed.

In view of the prior art, there remains a need to provide a more efficient, cost-effective, means for monitoring bunker transfer characteristics and for signing off or otherwise verifying or authenticating that the bunker transfer has been carried out correctly. There is a need for access to accurate, in-line, real-time, measurements of parameters or characteristics related to a bunker delivery session during which a fluid is delivered from a supplying marine vessel, or bunker barge, to a receiving marine vessel. A vessel means a sea-going vessel or watercraft such as a barge, a boat or a ship, for example. The fluid may be a multiphase fluid or any mixture of two or more components in which the base phase is a liquid, such as liquids with entrained gas, particle-laden flows, slurries, emulsions, and multi-liquid mixtures. Preferably, the fluid is bunker fuel.

BRIEF SUMMARY OF THE DISCLOSURE

According to a first embodiment, there is disclosed herein a system for monitoring and verifying a delivery process during which a fluid is delivered, via a bunker line, from a supplying marine vessel to a receiving marine vessel in accordance with a set of preestablished contractual terms, the system comprising:
  a data capture device configured to capture data related to
    the delivery process; and
  a monitoring unit configured to be operably connected to
    the data capture
  device to receive the data related to the delivery process,
    the monitoring unit comprising:
  at least one processor configured to generate an electronic
    record comprising at least part of the received data
    related to the delivery process; and at least one memory
    to store the electronic record and/or the received data
    related to the delivery process;
  characterized in that:
  the system further comprises a private local area network
    comprising:
  a first wireless transceiver configured to be operably
    connected to the monitoring unit, the first wireless
    transceiver being configured to provide wireless access
    to the monitoring unit by one or more wireless communications devices of one or more authorized first
    users on the supplying marine vessel;
  a second wireless transceiver configured to be operably
    connected to the first wireless transceiver and configured to provide a point-to-point wireless link between
    the supplying marine vessel and the receiving marine
    vessel; and
  a third wireless transceiver, for location on the receiving
    marine vessel, configured to provide wireless access to
    the second wireless transceiver by one or more wireless
    communication devices of one or more authorized
    second users on the receiving marine vessel via the
    point-to-point wireless link;
  the processor being further configured to generate a
    dashboard, accessible to the first and second users
    having access to the private local area network, the
    dashboard being configured to present the electronic
    record to the first and second users and to accept an
    electronic signature of each of the first and second users
    to indicate, respectively, whether the first and second
    users have each positively verified the electronic record
    with respect to said preestablished contractual terms,
    the delivery process being verified when both the first
    and second users have provided their electronic signatures.

The data capture device may be an electronic memory, a computer memory or a database in which some data related to the delivery session has been stored. The data related to the delivery session may be, for example, the receiving vessel name or serial number, the delivery vessel name or serial number, a reference number for the delivery session, a reference number or name of the fluid being delivered, a reference indicating a phase of the delivery session, and so on. The data capture device, according to another embodiment, may be an apparatus such as a navigation system, where the data related to the delivery session may be a global position of the barge or the vessel during the delivery session and/or a date and/or time when the delivery session takes place. According to another embodiment, the data capture device may be a computer and the data related to the delivery session may be an IP address of the computer. According to still another embodiment, the data capture device may be a video camera and the data related to the delivery session may be video images of a part of the bunkering process. According to yet another embodiment, the capture device may be a measurement apparatus having one or more sensors to measure one or more parameters related to the delivery process, such as a level of fuel in a tank, a mass flow rate of the fuel being delivered through the bunker line, the temperature of the fuel, the viscosity of the fuel, etc. Several different capture devices of different types may be used in an embodiment.

The third wireless transceiver may be a transceiver of any wireless device on the receiving vessel. For example, a transceiver of a tablet computer or a transceiver of a smartphone. The third transceiver may otherwise be a transceiver of a network device on the receiving vessel to which a user on the receiving vessel may connect using a computing device such as the receiving vessel's bridge computer or a portable computer. The third wireless transceiver may have an antenna in some embodiments.

The data captured by the data capture device can be any data that can be used to substantiate or verify that the contractual obligations of the operation have been properly carried out in line with any compliance criteria or regulatory criteria generally used in the bunkering domain to meet the required safety and/or legal requirements.

According to another embodiment, a computer-implemented method for monitoring and verifying a delivery process during which a fluid is delivered, via a bunker line, from a supplying marine vessel to a receiving marine vessel in accordance with a set of preestablished contractual terms, the method comprising:

- capturing at least one datum related to the delivery process or measuring at least one set of parameters relative to one or more from: a mass flow rate of the fluid through at least a part of the bunker line; a physical property of the fluid; a chemical property of the fluid; and a quality of the fluid;
- generating, using a processor, an electronic record comprising at least one parameter from the set of parameters;
- storing the electronic record in a memory;
- generating, using the processor, a dashboard, the dashboard being configured to present the electronic record and to accept an electronic signature from at least two users, to indicate whether the two users have each positively verified the electronic record with respect to said preestablished contractual terms;
- providing access to the dashboard, on a private local area network, by a wireless communications device of at least one authorized first user on the supplying marine vessel, via a wireless router on the supplying marine vessel;
- providing access to the dashboard, on the private local area network, by a wireless communications device of at least one authorized second user on the receiving marine vessel, via a point-to-point wireless communications channel between a wireless access point on the supplying marine vessel and a wireless client device of the wireless access point, the wireless client device being on the receiving marine vessel; and
- receiving, via the dashboard, an electronic signature of the authorized first user to indicate whether the authorized first user has verified the electronic record with respect to the preestablished contractual terms and an electronic signature of the authorized second user to indicate whether the second user has verified the electronic record with respect to the preestablished contractual terms, the delivery process being verified when both of said electronic signatures have been received.

According to an embodiment, the delivery process is verified when all regulatory conditions have been met, and may include the electronic signatures mentioned above, an IP address signature, a geotag signature and/or a date stamp, including time of day, among others.

According to yet another embodiment, provision is made for non-transitory computer-readable medium, which when implemented by a computer, cause the computer to perform the method disclosed above.

According to a another embodiment, a computer program product stored on a computer usable medium is provided, the computer program product comprising computer readable program means for causing a computer to carry out the method disclosed above.

Embodiments of the present invention allow for one or more aspects of a bunker fuel delivery process to be monitored and verified, preferably in real-time. Bunkering processes generally take place between marine vessels at sea, where broadband or satellite communications between vessels may be costly, unreliable and/or may lack sufficient bandwidth to provide for the required real-time monitoring.

Embodiments described herein provide for economic, bi-directional, low-latency, real-time communication of reliable bunker-related information between the Barge Master of the supplying vessel and the Chief Engineer of the receiving vessel, thereby allowing for back-and-forth signing and countersigning of electronic documents to verify and sign-off on the important aspects of the bunkering session, or process.

BRIEF DESCRIPTION OF THE DRAWINGS

The inventive concepts described herein will be better understood thanks to the detailed description which follows and the accompanying drawings, which are given as non-limiting examples of embodiments of the inventive concepts, namely.

DETAILED DESCRIPTION

A system is disclosed for streamlining the bunker delivery process in the maritime industry. The system provides a bunker delivery platform to improve efficiency and to build transparency into the bunker delivery process. The platform allows for stakeholders in the bunker delivery process, such as the Barge Master of the bunker barge, or supplying marine vessel, and the Chief Engineer of the receiving marine vessel, to monitor and verify, among other things, the quantity and/or quality of the fuel in real time during the delivery process. A dashboard with data indicating key characteristics of the process, is made available to each of the stakeholders so that they can verify the process with respect to a preestablished contract stating certain criteria which have to be met. The data presented in the dashboard may come directly from various sensors in a measurement apparatus operably connected to the bunker line through which the fuel is delivered, the sensors being configured to measure parameters such as the mass flow rate of the fuel as it transits through the bunker line, the temperature of the fuel, the density of the fuel, parameters related to the chemical content of the fuel, for example the Sulphur content, the pressure in the bunker line, differential pressure across a part of the bunker line and so on. The system includes a monitoring unit, which is a custom hardware component comprising a processor and a memory, configured to collect the measurement data from the sensors in the measurement apparatus. The monitoring unit also runs custom software to provide access to the measurement data by authorized users on the supplying marine vessel and on the receiving marine vessel.

Instead of, or as well as, showing measurement data in the dashboard, the system may comprise other types of data capture devices than simply the measurement apparatus. Any other type of data useful in substantiating or otherwise authenticating the contractual or regulatory requirements may be used. For example, the system may comprise a memory or have access to a database in which data relative to the delivery session may be stored, like a name of the vessel, the type of fuel being delivered, etc. The data capture device may be a GPS device or an AIS system, used for automatically tracking vessel positions, for providing global coordinates of the position of the vessel or it may be a timer for providing date and/or time information of the delivery session. According to an embodiment, the data capture device may be a video capture device for capturing video data of all or part of a process or process step during the delivery session. For example, the sampling process involves collecting three small bottles of the fuel by collecting small drops of the fuel at certain times during the delivery session. The video capture device may be configured to provide a video stream of the sampling process, the video data being received by the monitoring unit and transmitted via the point-to-point wireless communications link. By including the video feed in the electronic record for display in the dashboard, it can then be properly verified that the sampling process was carried out according to the regulatory procedure.

Embodiments of the system described herein include a private local area wireless network, built around a wireless router which is preferably on the supplying marine vessel. The monitoring unit and the router are interconnected via a physical local area network connection and the router is also connected to a wireless access point which is configured to implement a point-to-point bi-directional wireless communication link to a corresponding client wireless router on the receiving marine vessel, preferably in direct line of site with the wireless access point on the supplying marine vessel. Authorized users having mobile communications devices on the receiving vessel can therefore access the monitoring unit via this private local area wireless network using a web browser for example. The system may also produce an electronic Bunker Delivery Note as well as other documents required for auditing the delivery process. The Bunker Delivery Note may be made available to the Chief Engineer via the private local area network. When both parties agree that the electronic documents correspond to the quantity and quality of the delivered fuel, they can each provide their electronic signatures via the portal, indicating that the delivery process has been verified. Details of the contract may be stored in the system so that the parties can perform the verification. These details may include a bunker delivery sampling procedures form, handling procedures form, ullages report for initial pre-delivery measurements, bunker analysis report, safety checklists, the amount of fuel expected, and so on. After delivery, further electronic documents may be produced, such as a bunker delivery receipt, an ullage report and a statement of facts.

The system provides the advantage that electronic documents can be automatically generated, based on real-time in-line measurements received from different sensors in the measurement apparatus while the fuel is being delivered. Errors which may occur due to manual data entry are thus avoided. The documents can be exchanged back and forth between the supplying vessel and the receiving vessel over the private wireless network for cross verification. Electronic documents can also readily be signed to indicate a party's approval.

Users have access, via a client portal, using secure, permissioned, URL access to the information and metrics regarding the bunker delivery via a real-time interactive bunker management dashboard. Users can view current and historical bunker delivery information, including electronic Bunker Delivery Notes, mass flowmeter measurement data, barge audit records and reports, operational timelines and metrics regarding the delivery process such as mass flowmeter profiles, for example. Thanks to the system of the invention, current and historical bunker delivery information may be viewed by authorized users in any global location.

According to an embodiment, access to a wide area network may also be provided by connecting a gateway device to the router having access to a satellite connection for example. In this embodiment, an electronic invoice for the delivery may be sent directly to the customer based on the electronic bunker delivery note. In this embodiment, the monitoring unit is further configured to upload the measurements to the cloud via the gateway device so that they may be consulted by other authorized parties in other locations. The system thus provides automatic, real-time reporting to other stakeholders in the bunkering process apart from the barge master of the delivery vessel and the Chief Engineer of the receiving vessel, such as port authorities, customs authorities, and so on.

Figure 1:
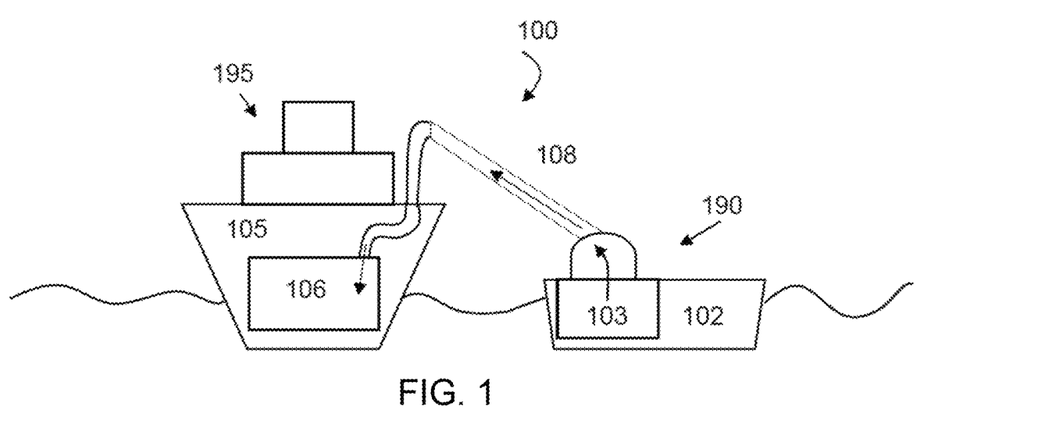
FIG. 1, illustrating a bunkering process taking place at sea, where bunker fuel is delivered from a supplying marine vessel, or bunker barge, to a receiving marine vessel via a bunker line.

Referring to FIG. 1, a bunkering session is illustrated 100, in which bunker fuel is transferred from a storage tank 103 of a supplying marine vessel, a bunker barge 102, through a bunker line 108 to one or more fuel tanks 106 of a receiving vessel 105. Bunker barges are usually smaller, and shorter in height, than the receiving vessel and so the bunker barge may have a crane to lift the bunker line high enough to allow the bunker line to be connected to the receiving vessel's bunkering manifold.

Figure 2:
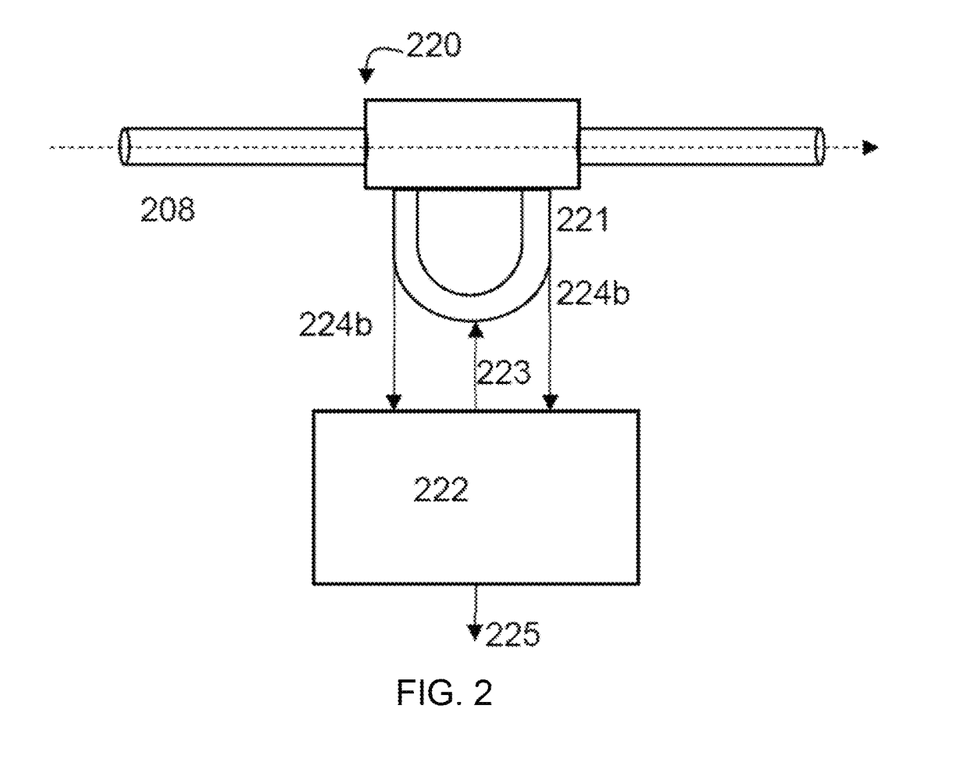
FIG. 2, showing a bunker line in which a mass flowmeter has been inserted, the mass flowmeter comprising at least one motion sensor and being controlled by a transmitter/controller.

FIG. 2 shows a schematic representation of a Coriolis mass flowmeter 221, which may be inserted into the bunker line 208, and which may be used to measure the flow rate of fluid, the bunker fuel, as it passes through the bunker line. A magnet and coil assembly, located at a certain part of the mass flowmeter, is driven by an electrical signal 223, which causes a part of the mass flowmeter to vibrate, or oscillate, during operation. The way the different parts of the flowmeter oscillate depends on the mass flow rate of the fluid travelling through the mass flowmeter. At least two further magnet and coil assemblies are placed on the mass flowmeter at different locations along the flow of the fluid to operate as sensors. The vibrations of these parts of the flowmeter cause the sensors to provide electrical signals which are out of phase with one another. The sensors produce sinusoidal signals 224a, 224b representing the motion of the corresponding part of the mass flowmeter, caused by the flow of the fluid through the mass flowmeter. By comparing the phase of the signals produced by the sensors the mass flow rate of the fluid flowing through the meter can be determined. The mass flowmeter usually operates along with a transmitter/controller 222 to drive the mass flowmeter and to receive the sensor signals and process them. The transmitter/controller, usually called simply a transmitter, may output such parameters 225 as mass and volume flow, net product content or flow, temperature, density or concentration, for example.

Coriolis mass flowmeters use the Coriolis principle to measure the mass flow rate (kilograms per hour) and density directly. Such mass flowmeters can be configured to display mass flow rate, volumetric flow rate, or a combination of both. Some mass flowmeters may also present the temperature of the liquid or liquid mixture being measured. The flow rate can be calculated from the phase difference between the signals received from the different sensors. Density can be calculated from the frequency of the signal from the sensors.

Figure 3:
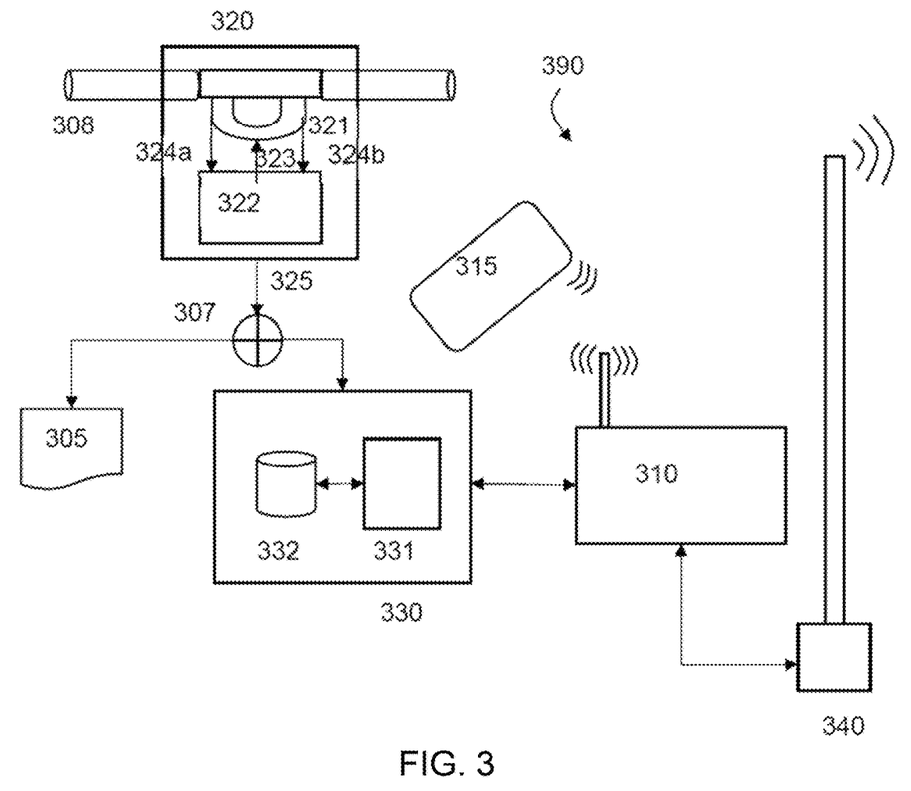
FIG. 3, showing a schematic representation of a part of a system according to an embodiment described herein.

FIG. 3 shows a schematic representation of a part of a system 390 for monitoring and verifying a delivery process during which a fluid is delivered, via a bunker line 308, from a supplying marine vessel to a receiving marine vessel, as described herein. FIG. 3 shows a part of the bunker line 308 through which the fluid is delivered. The system comprises a data capture device, which in this case is a measurement apparatus 320, engaged in some way with the bunker line to allow for certain parameters related to the delivery process to be measured. As shown in FIG. 3, the measurement apparatus may comprise a mass flowmeter 321. The mass flowmeter may be a Coriolis mass flowmeter inserted into the bunker line so that the mass flowmeter can measure the mass flow rate of the fluid as it travels through the bunker line. According to other embodiments, the measurement apparatus may have different types of sensors to allow it to measure different parameters. For example, a temperature sensor may engage with the bunker line by probing into the flow of the fluid in the bunker line. Other sensors are possible, for example, a timer, one or more pressure sensors to measure the pressure of the fluid in the bunker line or to measure a pressure difference along a part of the bunker line, a rheometer to measure viscosity of the fluid or one or more from a number of different chemical sensors to detect such things as a percentage water content in the fluid; a percentage sediment content in the fluid; a percentage Sulphur content in the fluid; or a percentage ash content in the fluid, and so on.

In FIG. 3, the mass flowmeter is shown in combination with its transmitter 322, which provides the electrical signals 323 to cause the oscillations in the mass flowmeter and which receives the electrical signals 324a, 324b from the sensors in the mass flowmeter, allowing the mass flow rate of the fluid through the bunker line to be calculated and for the density of the fluid to be calculated. Preferably, the mass flowmeter is located at the supplying marine vessel.

The system further comprises a monitoring unit 330, which is connected to the measurement apparatus so that the monitoring unit can receive the measured parameters 325 as they are measured. According to an embodiment, the monitoring unit comprises 330 at least one memory 332 for storing the measured parameters and at least one processor 331 to process the measured parameters. The parameters may be measured at different time intervals during the delivery process and fed to the monitoring unit. The processor may be configured to generate an electronic record comprising at least one parameter from the received set of measured parameters. The electronic record may otherwise, or in addition, comprise a datum derived or otherwise calculated from one or more of the measured parameters. According to a particular embodiment, especially when the measurement apparatus comprises a Coriolis mass flowmeter, the measurement apparatus further comprises a flow computer (not shown in FIG. 3) adapted to receive the parameter measurements from the mass flowmeter and to treat them. Mass flowmeter manufacturers sometimes provide the mass flowmeter and flow computer together as a unit in order to improve metrology performance and to reduce measurement uncertainty thus ensuring compliance with measurement contracts. Such units are usually certified by a Weights and Measures authority or by a port authority or other similar metrology authority responsible for ensuring that the units comply with industry-accepted metrology requirements. In such embodiments, the monitoring unit collects the measurement parameters from the mass flowmeter in read-only mode, thus ensuring that the data received by the monitoring unit meets the compliances certified by the relevant authority. In other embodiments, without a flow computer, the monitoring unit reads the measurement parameters directly from the mass flowmeter and it is the combination of mass flowmeter and monitoring unit which is certified by the relevant authority.

The processor of the monitoring unit is further configured to generate a network-accessible dashboard, accessible, preferably using a web browser, to the first and second users having access to the private local area network, the dashboard being configured to present the electronic record to the first and second users and to accept an electronic signature of each of the first and second users to indicate, respectively, whether the first and second users have each positively verified the electronic record with respect to said preestablished contractual terms, the delivery process being verified when both the first and second users have provided their electronic signatures.

According to an embodiment, as well as feeding the measurement data from the mass flowmeter to the monitoring unit, a printer 305 may be used on the supplying vessel to print a bunker delivery receipt. This is shown in FIG. 3, where after the bunkering process has been completed, a switch 307 can be actioned to switch the measurement apparatus output to go to the printer. Embodiments also exist without the printer and the switch.

The monitoring unit is connected, via a physical communications network cable, to a wireless router 310 on the supplying marine vessel, or barge. Users on the barge can thus connect to the monitoring unit using a web browser to view the measurement results using a mobile communications device such as a telephone or a tablet computer 315 for example. According to an embodiment, the monitoring unit is configured to run a software application to present the measurement data, or other data derived or otherwise calculated from the measurement data, in a dashboard accessible by web browser. In embodiments where the data capture device is a video capture device, the monitoring unit is configured to present all or part of video content captured during at least a part of a process during the delivery session in the dashboard accessible via a web browser. Similarly, when the data capture device captures data from a memory or from a database, the monitoring unit is configured to present the captured data in the dashboard.

According to the embodiment, the system further comprises an antenna, connected by a physical communications network cable to the wireless router and configured as a wireless access point 340 to provide a point-to-point wireless communications link to a corresponding further transceiver on the receiving vessel, the further transceiver being configured as a client device to the access point. Preferably, the placement of the access point and the client on their respective vessels is chosen to provide for line-of-sight communication between the barge and the receiving vessel via the point-to-point communications link. FIG. 3 shows the system up to the wireless access point. The client device and the receiving vessel are not shown. The further transceiver may also have an antenna and may provide wireless connection to one or more computers or mobile devices on the vessel. In another embodiment, the further transceiver may be part of a mobile communications device such as a smartphone or a tablet computer or other mobile communications device.

The point-to-point communications network is preferably a private network. The network thus created, including wireless devices on the receiving vessel and wireless devices on the barge and the monitoring unit, can be said to be an Intranet.

Figure 4:
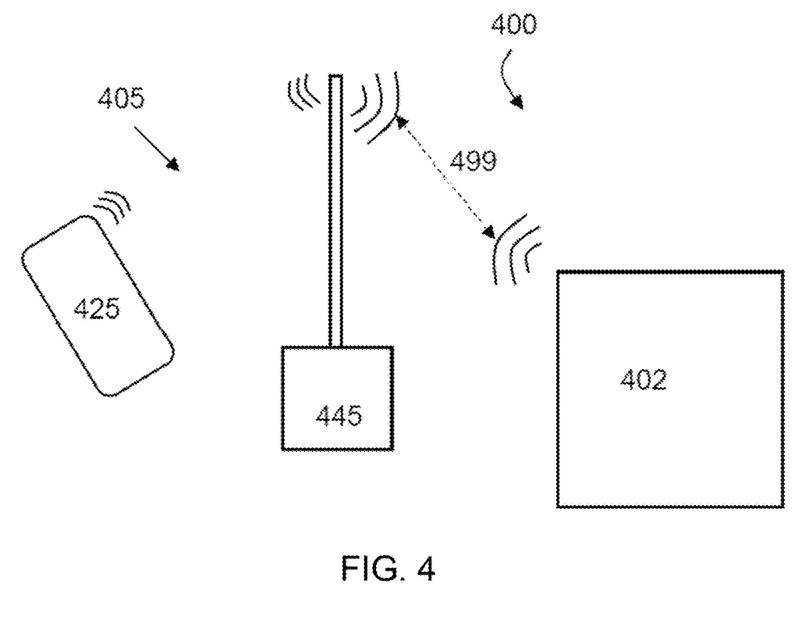
FIG. 4, showing a schematic representation of a system according to an embodiment described herein.

The system 400, as it is deployed over the barge 402 and the receiving vessel 405 according to one embodiment, is schematically represented in FIG. 4. FIG. 4 shows the barge and its system components 402, graphically represented by a box, in point-to-point wireless communication 499 with the receiving vessel 405. The receiving vessel has the antenna 445 configured as a router which is a client of the access point on the barge. Authorized users on the receiving vessel can then connect to the network using their mobile communications devices 425.

Figure 5:
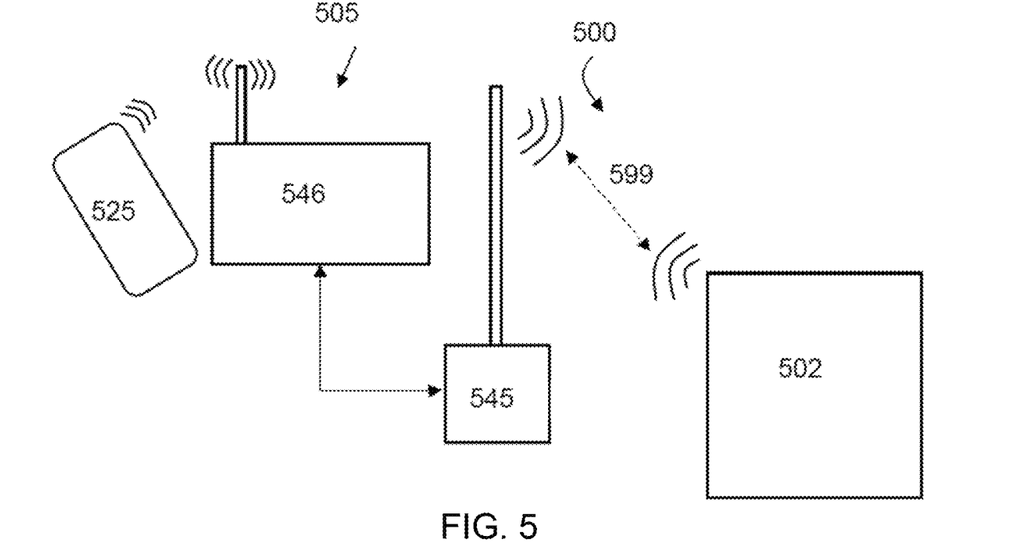
FIG. 5, showing a schematic representation of a system according to another embodiment described herein.

According to another embodiment, shown in FIG. 5, the receiving vessel 505 further comprises a further router 546, connected to the further antenna 545, allowing users 525 on the receiving vessel to connect to the network 599.

According to an embodiment, there is no antenna on the receiving vessel and the point-to-point communications link is completed using a transceiver of a mobile communications device used on the vessel.

Figure 6:
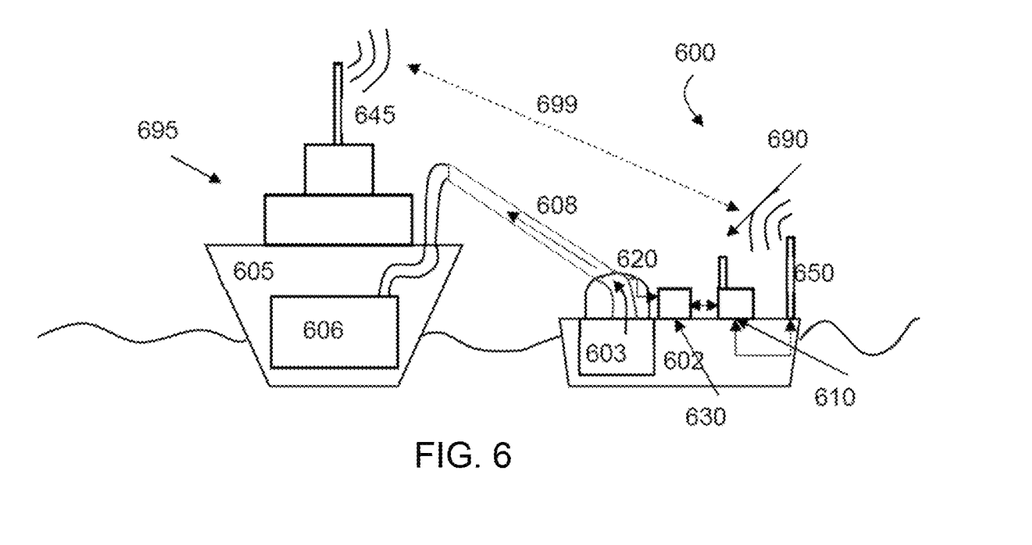
FIG. 6, illustrating a system according to an embodiment described herein.

FIG. 6 illustrates an example of a system 600 in which an embodiment of the invention may be deployed. On the barge 602, there is a data capture device. In this case, the data capture device is a measurement apparatus 620, which measures a set of parameters related to the delivery process by engaging with the bunker line 608 through which the fuel delivery takes place. The measurement data is read off and stored by the monitoring unit 630. The monitoring unit is also configured to run an application to produce a network-accessible dashboard in which the measurements are presented. The dashboard may be accessible using a web browser, over the private wireless communications network. The monitoring device is configured such that the thus-generated dashboard accepts inputs from authorized users, preferably in the form of an electronic signature of the user to indicate that the user has verified that the measurements or parameters presented in the dashboard meet with the requirements stated in a set of preestablished contractual terms relating to the delivery process.

In embodiments in which the data capture device is a video capture device, the monitoring unit is configured to treat the captured video data of all or part of a process used during the delivery session to allow it to be displayed in the dashboard.

Using embodiments described herein, it is possible for both the Barge Master and the Chief Engineer of the receiving vessel to monitor one or more characteristics of the bunkering session in real time as the bunker fuel is being delivered thanks to the point-to-point private wireless network 699 and the dashboard created by the monitoring unit 630. The system may comprise different sensors allowing for various different characteristics to be monitored, including: the viscosity of the delivered fuel; its density; its temperature; its mass; its flow rate; the percentage water content in the delivered fuel; the percentage sediment content; the percentage Sulphur content; the percentage ash content; and the time taken to pump the delivered fuel or the times during which the pumping took place. In a preferred embodiment, the system comprises pressure sensors to measure differential pressure over the flowmeter, which is useful to compensate a measurement when entrained gas is included in the bunker fuel. Using the measured parameters and characteristics an electronic bunker delivery note (BDN) may be generated and populated automatically. Other documents or certificates relating to the bunker session may also be generated and populated using measured values. The generated electronic documents may be electronically signed by the Barge Master and then transmitted wirelessly to the Chief Engineer of the receiving vessel, who can then countersign the documents and send copies back to the Bunker Master. According to an embodiment, the documents may be sent to the cloud.

Figure 7:
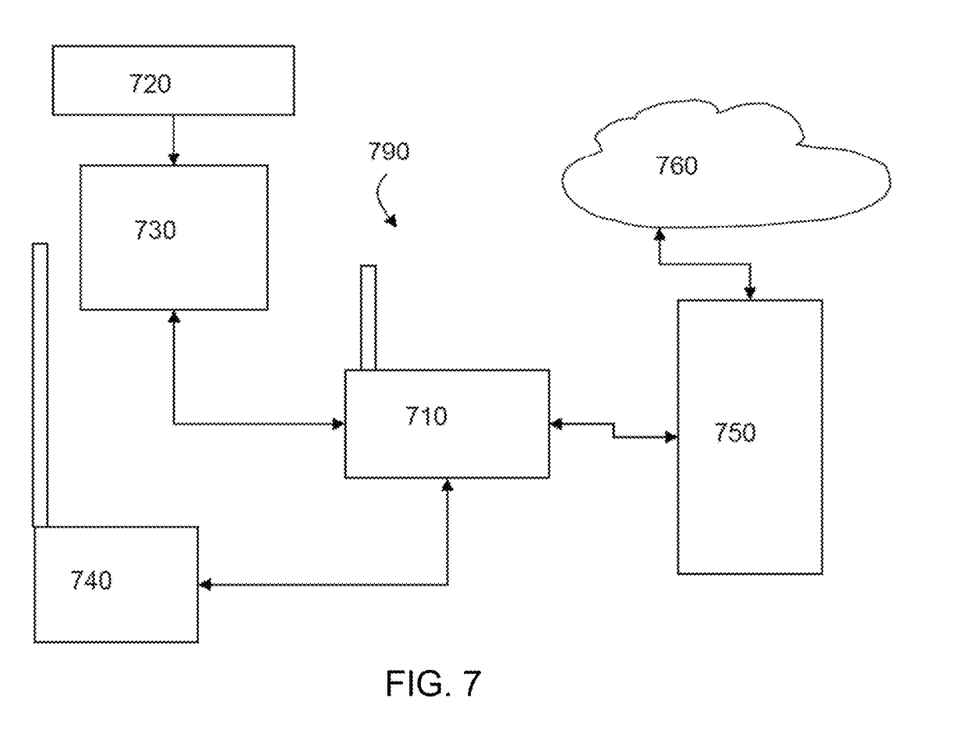
FIG. 7, showing a schematic representation of a part of the disclosed system on the supplying vessel according to an embodiment in which access to a wide area network is provided via a gateway device.

FIG. 7 illustrates an embodiment which comprises a gateway device 750, connected via a physical local area network cable to the router 710 on the barge, for example a Sigma Cluster. In this embodiment, the monitoring unit 730 can store its measurements, or other data for monitoring the delivery process, in the cloud 760, where it is accessible to authorized users wherever their location provides them with access to the cloud, for example using satellite technology or 4G communications technology. Whenever the vessel is in a location where access to the cloud is available, it can upload its measurement data and or/receive software modifications or settings modifications from the cloud. The measurement data, video data, invoicing data, or any other data used for verifying the delivery process, may also thus be made available to clients or other stakeholders in the delivery process, preferably via a dashboard accessible via a web browser. The data capture device, or measurement apparatus, is shown 720 as well as the monitoring unit 730, wireless router 710 and wireless access point 740 for building the point-to-point private bidirectional wireless link to the vessel.

According to an embodiment, the processor of the monitoring unit is configured to dismantle the private network when the bunkering process is completed.

What is claimed is:

1. A system for monitoring and verifying a delivery process during which a fluid is delivered, via a bunker line, from a supplying marine vessel to a receiving marine vessel, the system comprising:
    a data capture device configured to capture, from one or more sensors at a bunker line, data indicating one or more parameters related to a delivery process for a delivery of a fluid from a supplying marine vessel to a receiving marine vessel via the bunker line; and a monitoring unit configured to be operably connected to the data capture device to receive the data related to the delivery process, the monitoring unit comprising:
at least one processor configured to generate an electronic record comprising at least part of the received data indicating the one or more parameters and information related to the delivery process; and
at least one memory to store the electronic record and the received data indicating the one or more parameters and information related to the delivery process;

a private local area network comprising:
a first wireless transceiver configured to be operably connected to the monitoring unit, the first wireless transceiver being configured to provide wireless access to the monitoring unit by one or more wireless communications devices of one or more authorized first users on the supplying marine vessel;
a second wireless transceiver configured to be operably connected to the first wireless transceiver and configured to provide a point-to-point wireless link between the supplying marine vessel and the receiving marine vessel; and
a third wireless transceiver, for location on the receiving marine vessel, configured to provide wireless access to the second wireless transceiver by one or more wireless communication devices of one or more authorized second users on the receiving marine vessel via the point-to-point wireless link;
the processor being further configured to generate a dashboard, accessible to a first authorized user and a second authorized user having remote access to the private local area network, the dashboard being configured to present the electronic record to the first authorized user and the second authorized user and to automatically verify the delivery process responsive to receiving a first input indicating an electronic signature of the first authorized user and a second input indicating an electronic signature of the second authorized user.

2. The system according to claim 1, wherein said data capture device is configured to capture said data over time during the delivery process, the processor of the monitoring unit being further configured to present all or part of the captured data in the dashboard as a stream over time.

3. The system according to claim 1, wherein the data capture device, the monitoring unit and the first and second wireless transceivers are located on the supplying marine vessel, a measurement apparatus is connected to the monitoring unit by a first physical electrical communications connection, and the monitoring unit is connected to the first wireless transceiver by a further physical electrical communications connection.

4. The system according to claim 1, wherein the second wireless transceiver and said third wireless transceiver are positioned to be able to perform line of sight communication with each other.

5. The system according to claim 1, wherein the first wireless transceiver comprises a wireless router, the second wireless transceiver comprises a wireless access point and said third wireless transceiver comprises a client of the wireless access point.

6. The system according to claim 1, wherein said data capture device comprises a measurement apparatus configured to engage with the one or more sensors at the bunker line to measure the one or more parameters associated with one or more from:
a mass flow rate of the fluid through at least a part of the bunker line;
a physical property of the fluid; a chemical property of the fluid; and
a quality of the fluid.

7. The system according to claim 1, wherein said data capture device comprises one from:
a computer memory or a database within which at least a part of said data indicating one or more parameters related to the delivery process has been captured;
a timer to capture a date and/or a time related to at least a part of the delivery process;
a global position sensor to capture a position of the supplying marine vessel and/or the receiving marine vessel during at least a part of the delivery process; and
a video capture device to capture video data of at least a part of the delivery process.

8. The system according to claim 1, wherein said data capture device comprises a measurement apparatus comprising a mass flowmeter configured to be inserted in the bunker line, the one or more parameters being associated with at least a mass flow rate of the fluid through at least a part of the mass flowmeter, the mass flowmeter comprising a plurality of motion sensors of the one or more sensors, the plurality of motion sensors each configured to provide an electrical signal as a function of a movement of at least a part of the mass flowmeter to which a respective motion sensor is attached, the measurement apparatus further comprising a transmitter configured at least:
to drive a part of the mass flowmeter to cause at least a part of the mass flowmeter to oscillate;
to receive the electrical signals from a respective one motion sensor from the plurality of motion sensors; and
to calculate the mass flow rate of the fluid through the bunker line as a function of a phase difference between the electrical signals from at least two of the motion sensors.

9. The system according to claim 8, wherein the transmitter is further configured to calculate a density of the fluid based on a frequency of the received electrical signals from one or more of the motion sensors.

10. The system according to claim 8, wherein the measurement apparatus further comprises a flow computer configured to be operably connected to the mass flowmeter and configured to calculate the one or more parameters based at least on the mass flow rate of the fluid through the mass flowmeter and/or a density of the fluid as measured by the mass flowmeter, and configured for the flow computer and the mass flowmeter to form a combination which has been certified by a metrology authority as being a combination which provides accurate sets of parameters.

11. The system according to claim 8, wherein the monitoring unit is configured to calculate the one or more parameters based at least on the mass flow rate of the fluid through the mass flowmeter and/or a density of the fluid as measured by the mass flowmeter, and for the mass flowmeter and the monitoring unit to form a combination which has been certified by a metrology authority as being a combination which provides accurate sets of parameters.

12. The system according to claim 6, wherein the measurement apparatus comprises one or more from:
a temperature sensor;
one or more pressure sensors;
a rheometer;

a timer; and
a chemical sensor;
the one or more parameters comprising one or more from:
a temperature of the fluid;
a pressure of the fluid in at least a part of the measurement apparatus or a pressure difference over a part of the measurement apparatus;
a viscosity of the fluid; a time taken to deliver all or part of the fluid;
a percentage water content in the fluid;
a percentage sediment content in the fluid;
a percentage Sulphur content in the fluid; and
a percentage ash content in the fluid.

13. The system according to claim 1, the system further comprising a gateway device configured to be connected to the first wireless transceiver by a still further physical electrical communications connection, the gateway device being configured to provide secure access to a wide area network by the processor of the monitoring unit, the processor being configured to store a set of measurements on a storage device of the wide area network, the gateway device and the first wireless transceiver being configured to provide secure access to the wide area network by one or more wireless communications devices of one or more first authorized users on the supplying marine vessel.

14. The system of claim 1, wherein the data capture device, the monitoring unit and the dashboard are configured to monitor and verify the delivery of the fluid in real-time.

15. A computer-implemented method for monitoring and verifying a delivery process during which a fluid is delivered, via a bunker line, from a supplying marine vessel to a receiving marine vessel, the method comprising:
capturing, at a computer system from one or more sensors at a bunker line, at least one datum indicating one or more parameters related to a delivery process of a fluid from a supplying marine vessel to a receiving marine vessel via the bunker line, the one or more parameters associated with one or more from: a mass flow rate of the fluid through at least a part of the bunker line, a physical property of the fluid, a chemical property of the fluid, and a quality of the fluid;
storing, in a memory of the computer system, the at least one datum indicating the one or more parameters and information associated with the delivery process;
generating, using a processor, an electronic record comprising all or part of the at least one datum indicating the one or more parameters;
storing the electronic record in the memory;
generating, using the processor, a dashboard, the dashboard being configured to present the electronic record and to accept electronic signatures from at least two authorized users;
providing remote access to the dashboard, on a private local area network, by a wireless communications device of at least one authorized first user on the supplying marine vessel, via a wireless router on the supplying marine vessel;
providing remote access to the dashboard, on the private local area network, by a wireless communications device of at least one authorized second user on the receiving marine vessel, via a point-to-point wireless communications channel between a wireless access point on the supplying marine vessel and a wireless client device of the wireless access point, the wireless client device being on the receiving marine vessel; and
automatically verifying the delivery process responsive to receiving, via the dashboard, a first input indicating an electronic signature of the authorized first user and a second input indicating an electronic signature of the authorized second user.

16. The method according to claim 15, wherein the electronic record comprises a bunker delivery note.

17. The method according to claim 15, wherein the mass flow rate is measured by a Coriolis mass flowmeter inserted in the bunker line.

18. The method according to claim 15, further comprising transmitting all or part of captured data to a base station using a satellite transceiver.

19. A non-transitory computer-readable medium comprising instructions, which when implemented by a computer, cause the computer to perform operations comprising:
capturing, at a computer system from one or more sensors at a bunker line, at least one datum indicating one or more parameters related to a delivery process of a fluid from a supplying marine vessel to a receiving marine vessel via the bunker line, the one or more parameters associated with one or more from: a mass flow rate of the fluid through at least a part of a bunker line; a physical property of the fluid; a chemical property of the fluid; and a quality of the fluid;
storing, in a memory of the computer system, the at least one datum indicating the one or more parameters and information associated with the delivery process;
generating, using a processor, an electronic record comprising all or part of the at least one datum indicating the one or more parameters;
storing the electronic record in the memory;
generating, using the processor, a dashboard, the dashboard being configured to present the electronic record and to accept electronic signatures from at least two authorized users;
providing remote access to the dashboard, on a private local area network, by a wireless communications device of at least one authorized first user on the supplying marine vessel, via a wireless router on the supplying marine vessel;
providing remote access to the dashboard, on the private local area network, by a wireless communications device of at least one authorized second user on the receiving marine vessel, via a point-to-point wireless communications channel between a wireless access point on the supplying marine vessel and a wireless client device of the wireless access point, the wireless client device being on the receiving marine vessel; and
automatically verifying the delivery process responsive to receiving, via the dashboard, a first input indicating an electronic signature of the authorized first user to and a second input indicating an electronic signature of the authorized second user.

20. The non-transitory computer-readable medium of claim 19 comprising instructions, which when implemented by the computer, cause the computer to perform operations further comprising transmitting all or part of the captured at least one datum to a base station using a satellite transceiver.

21. A computer program product stored on a computer usable medium, comprising computer readable program for causing a computer to perform operations comprising:
capturing from one or more sensors at a bunker line at least one datum indicating one or more parameters related to a delivery process of a fluid from a supplying marine vessel to a receiving marine vessel via the bunker line, the one or more parameters associated with one or more from: a mass flow rate of the fluid through at least a part of a bunker line, a physical property of the fluid, a chemical property of the fluid, and a quality of the fluid;

storing, in a memory of a computer system, the at least one datum indicating the one or more parameters and information associated with the delivery process;

generating, using a processor, an electronic record comprising all or part of the at least one datum indicating the one or more parameters;

storing the electronic record in the memory;

generating, using the processor, a dashboard, the dashboard being configured to present the electronic record and to accept an electronic signature from at least two authorized users;

providing remote access to the dashboard, on a private local area network, by a wireless communications device of at least one authorized first user on the supplying marine vessel, via a wireless router on the supplying marine vessel;

providing remote access to the dashboard, on the private local area network, by a wireless communications device of at least one authorized second user on the receiving marine vessel, via a point-to-point wireless communications channel between a wireless access point on the supplying marine vessel and a wireless client device of the wireless access point, the wireless client device being on the receiving marine vessel; and automatically verifying the delivery process responsive to receiving, via the dashboard, a first input indicating a first electronic signature of the authorized first user and a second input indicating a second electronic signature of the authorized second user.

* * * * *